Oct. 15, 1940.  H. H. LAMAR  2,217,842
VALVE STRUCTURE
Filed Nov. 8, 1938  2 Sheets-Sheet 1

WITNESS

INVENTOR
Harry H. Lamar.
BY
ATTORNEY

Oct. 15, 1940.   H. H. LAMAR   2,217,842
VALVE STRUCTURE
Filed Nov. 8, 1938   2 Sheets-Sheet 2

WITNESS   Fig. 6.

INVENTOR
Harry H. Lamar.
BY
ATTORNEY

Patented Oct. 15, 1940

2,217,842

UNITED STATES PATENT OFFICE 2,217,842

VALVE STRUCTURE

Harry H. Lamar, Wilkinsburg, Pa.

Application November 8, 1938, Serial No. 239,527

16 Claims. (Cl. 277—36)

The invention relates generally to valves and more particularly to high pressure valves.

In the operation of the high pressure valves heretofore employed by the trade, difficulty was experienced in actuating the valve head when it was attempted to operate the valve under certain pressure conditions. This resulted in operation failures and made it necessary to obtain a person acquainted with the valve construction and operation to operate it. Consequently, these high pressure valves could not be installed in places where the obtaining of an expert was uneconomical and apt to result in delays.

The object of the invention is to provide for a substantial balancing of pressures on the valve head disposed in the valve chamber to control the flow of fluids to facilitate the operation of the valve under all pressure conditions.

It is also an object of the invention to provide for the operation of a valve head without the use of auxiliary equipment and irrespective of the direction of application of the fluid pressures.

Other objects of the invention will, in part, be obvious, and, in part, will appear hereinafter.

The invention accordingly is disclosed in the embodiment thereof shown in the accompanying drawings and comprises the features of construction, combination of elements and arrangement of parts which will be exemplified in the construction hereinafter set forth and the scope of the application of which will be indicated in the claims.

For a general understanding of the nature and objects of the invention, reference should be had to the following detailed description taken in conjunction with the accompanying drawings in which:

Fig. 6 is a view in cross-section of a diaphragm such as utilized in the valves shown in Figs. 1 and 5.

Figure 1:
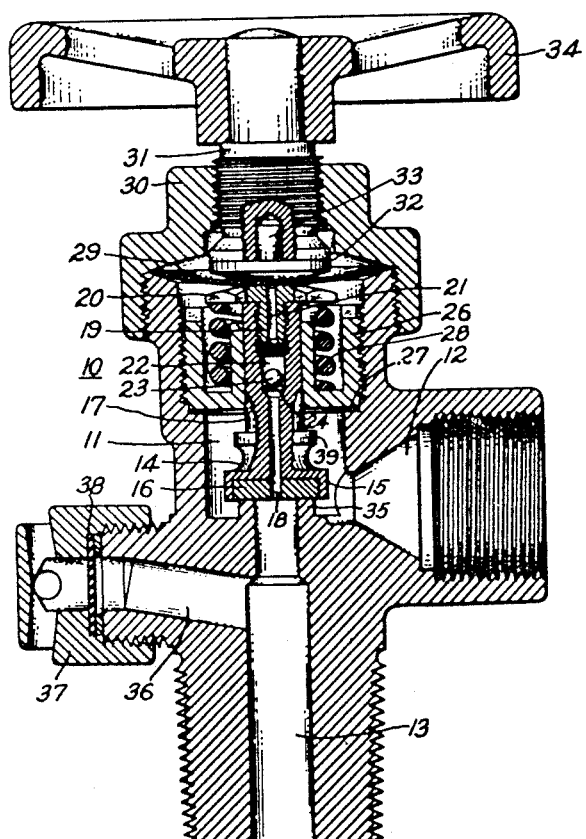
Figure 1 is a view, partly in section and partly in side elevation, of a valve constructed in accordance with the invention.

Referring now to the drawings and Fig. 1 in particular, a valve casing of a well known type is shown generally at 10. The casing may be cast or forged in accordance with usual practice in this art or manufactured in any other suitable manner known to the trade. After the rough casting has been made, the different portions may be machined and tapped to provide the necessary bores and threads that are required in the assembling of the parts and the mounting of the valve. Since it will be apparent from the drawing that these parts are in accordance with usual valve construction, it will not be necessary to describe them in detail, but they will be referred to from time to time throughout the specification as may be necessary in order to completely describe the construction and operation.

The casing 10 is provided with a chamber 11 to which access may be had through the laterally extending opening 12 or the vertical opening 13. The openings 12 and 13, together with the chamber 11, provide a passageway through the valve. It is through this passageway that fluids, the flow of which are to be controlled, must pass.

In order to control the flow of fluids through the passageway in the valve, a valve head 14 is provided. The valve head may be of any suitable construction well known in the art. In this particular instance the valve head consists of a piston-shaped member 15 having an insert 16 set in a depression provided in the lower face. The insert 16 will preferably be made from some suitable metallic material such as lead or non-metallic material such as Bakelite both known in this art for this purpose. In mounting the insert, it may be press-fitted or held in position in some other manner well known in the art.

The valve head is provided with a valve stem 17 which, in this instance, is cylindrical. As shown, an opening or bore 18 extends through the valve head insert and valve stem. The opening or bore in the upper end of the valve stem is larger in diameter than in the lower end. At the junction of the portions of the bore of different cross-sectional area, the wall of the valve stem is machined to simulate the shell of a conic frustum. While it is not essential that this particular shape be employed, the conic frustum has been found satisfactory. The purpose of such a construction will be described hereinafter.

The upper end of the valve stem is provided with an internal thread as illustrated. This internal thread is provided to receive the threaded stem 19 provided on a head 20 carried by the valve stem 17. An opening 21 is provided in the head 20 and stem 19 in alignment with the opening or bore 18 in the valve stem and is actually a continuation of the bore. As shown, the stem 19 does not extend downwardly the full length of the portion of the bore of larger diameter provided in the upper end of the valve stem. Therefore, a chamber 22 is provided in the valve stem for a purpose to be described hereinafter.

It will be noted that the head 20 is made with facets to facilitate the mounting of it in the valve stem. Further, the opening in the valve head is flared outwardly at the top. This is done to prevent a partial closure of the opening 21, and facilitates the closure of the opening or bore by means of the diaphragm to be described hereinafter.

In the operation of this valve, it is desirable to control the flow of fluids through the opening provided in the valve stem. In order to do this, a check valve is employed. The check valve comprises a bronze ball 23 mounted in the chamber 22 in the valve stem. When it is desired to restrict the flow of fluids upwardly through the valve stem, a small rest 24 such as a perforated bronze disk or spider is disposed in the chamber 22 to seat on the shoulder provided by machining the portion of the valve stem where the portions of the bore 18 of different cross-sectional area merge into one another.

In some embodiments of the invention a spring 25 is disposed on the rest 24 to retain the ball 23 in engagement with the stem 19 to close the opening through the valve stem 17. The spring may be of any suitable construction and need only be of sufficient strength to hold the ball 23 in position to close the opening 21 through the stem 19.

The valve stem 17 is loosely mounted in a plug 26 disposed in the valve chamber 11 dividing it into a main valve chamber and an auxiliary valve chamber, the lower valve chamber being the main valve chamber which cooperates with the openings 12 and 13 to provide the passageway through the valve. The plug may be of different shapes depending on the particular design of valve. In this embodiment of the invention, it simulates two cylinders spaced from one another and joined at the bottom. The plug 26 is threaded externally engages in an internal thread provided on the inner wall of the valve casing. In this particular construction a gasket 27 is disposed between the shoulder provided for receiving the plug and the bottom of the plug. This gives a fluid-tight joint.

In describing the valve stem as being loosely mounted, it is intended to convey that the stem is so mounted that fluid under pressure may flow between the valve stem 17 and plug 26 from the main chamber to the auxiliary chamber. No space has been illustrated between the valve stem 17 and the plug 26, since it will be so small that it is incapable of illustration and such a mounting is well understood by people skilled in this art.

A spring 28 is disposed in the plug 26 to engage the head 20 to bias the valve stem 17 and valve head 14 upwardly to cooperate in the operation of the valve. The spring need only be strong enough to effect the raising of the valve stem and valve head 14 when the pressures thereon are substantially balanced.

The diaphragm 29 is disposed directly above the head 20. As shown, the diaphragm engages the sides of the casing 10 and is retained in position by a cap 30 which may be mounted on the casing in any suitable manner. In this instance, the cap is provided with an internal thread which engages an external thread provided on the casing.

An actuating stem 31 is disposed for movement in the cap 30. This stem may be mounted in any suitable manner well known in the valve art, as, for example, providing an external thread thereon which engages in an internal thread in the cap 30.

A head 32 is provided on the actuating stem 31. This head may be mounted in any suitable manner. As illustrated, it is connected to the stem by means of a pin 33 which engages in both the head and the actuating stem 31.

The upper surface of the head 20 and the lower surface of the head 32 are curved as illustrated. The curvature will depend on the valve design and the proper operation of the diaphragm 29 to close the opening through the valve stem.

The valve wheel 34 is mounted on the upper end of the actuating stem 31 and may be connected thereto in any suitable manner as by means of a pin, not shown, or the actuating stem may be made with a squared upper end and a hand wheel provided with a corresponding opening therethrough for receiving the stem.

In the lower end of the valve chamber 11 a circular boss 35 is provided which extends upwardly around the opening 13. This boss presents a seat for receiving the valve head 14.

As illustrated, an opening 36 is provided which leads to the opening 13 in the lower portion of the valve casing. A cap 37 carrying a diaphragm 38 is mounted on a boss extending laterally from the valve casing. This provides an emergency relief in case of an unsafe pressure. This is not an essential point of this invention, but was merely illustrated to show a complete valve.

The assembly of the valve is a simple matter. The valve head and valve stem are first placed in position in the valve chamber 11. The plug 26 is then loosely fitted over the valve stem. Next the seat 24 and ball 23 are dropped into position in the valve stem 17. The spring 28 is located in the plug 26. The head 20 is then mounted on the valve stem 17.

The diaphragm is now mounted in the casing and the cap 30 carrying the actuating stem 31 and head 32 mounted on the valve casing 10 completing the valve.

In order to explain the operation of the valve, it will be assumed that it is mounted on a cylinder or other source of high pressure fluids, making a connection through the opening 12. Assuming now that the fluid under pressure cannot penetrate further than the main valve chamber, then the pressures built up on the valve head 14 will tend to retain it firmly in position on the seat 35. If the pressure is of any appreciable amount, the spring 28 will not be strong enough to raise the valve head when the actuating stem 31 is moved upwardly to effect an opening of the valve. It is impractical to make the valve large enough to carry a spring of sufficient strength to effect the opening of the valve under all the conditions to which such valves are exposed.

In the present valve, provision is made for effecting a substantial balance of the pressures on the opposite sides of the valve head 14 to enable the spring 28 to raise the valve head and open the valve when the operating stem 31 is actuated upwardly.

The functioning of the valve which results in a substantial balancing of the pressures on the valve head will now be described. As has been pointed out in the detailed description, the valve stem 17 is loosely mounted in the plug 26. Therefore, when fluid under pressure enters the main valve chamber 11, it will flow upwardly between the plug 26 and the valve stem 17, entering the auxiliary valve chamber above the plug 26.

When the actuating stem 31 is moved upwardly, releasing the diaphragm 29 and uncovering opening 21, fluid under pressure will flow from the auxiliary valve chamber downwardly through the opening 21 in the head 20, the chamber 22 and the opening or bore 18 extending through the stem and valve head 14. This will tend to balance the pressures on the upper and lower faces of the valve head 14. The result is that the spring 28 will raise the valve stem and head and the fluid under pressure may then flow through the passageway through the valve consisting of the opening 12, the main valve chamber 11 and the opening 13.

This type of valve has all the advantages of other valves, as well as the feature of balancing the pressures on the valve head. Assuming that it is desired to replace the diaphragm 29 when the valve is connected in a system and under pressure. The cap 30 is removed in the usual way. Immediately the valve head 14 will be forced upwardly projecting the flange 39 against the plug 26, thereby cutting off any possible flow of fluid under pressure between the valve stem 17 and the plug 26. The fluid under pressure from the main valve chamber may tend to flow through the opening or bore 18, but upon the first rush of fluid resulting from the removal of the cap 30, the check valve will function, that is, the ball 23 will be forced upwardly to close the opening 21. When the new diaphragm has been inserted, the cap will be replaced and the valve may be operated in the manner hereinbefore described.

When this valve is connected to a system in which there is a compressor as in a refrigeration system, the check valve functions to protect the diaphragm against pressure surges. This will give the valve a long life.

Figure 2:
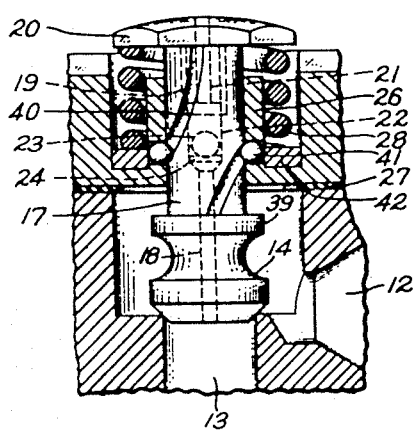
Fig. 2 is a view, partly in section and partly in side elevation, of a modification of the valve head, showing it provided with means for giving it a turning movement as it is actuated longitudinally.

Referring now to Fig. 2, in order to give the valve stem 17 and valve head 14 a turning movement as they are actuated downwardly to their seating position, grooves 40 are provided in the stem to receive balls 41 disposed in openings provided in the plug 26. These balls are retained in position by a ring 42 disposed in the plug 26.

Since the grooves 40 extend more or less spirally around the stem 17, when the head is projected downwardly it will take on a rotary movement. This will tend to dislodge any particles of dirt or other deleterious matter from the valve head or valve seat thereby effecting a proper closure of the valve.

Figure 3:
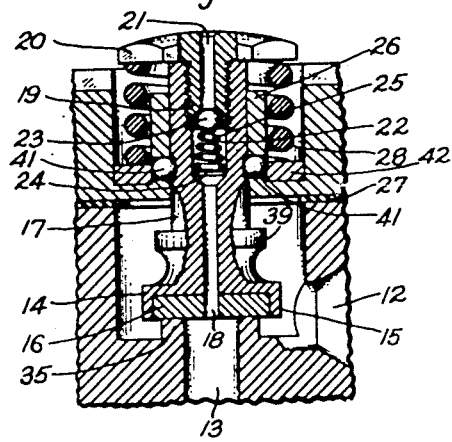
Fig. 3 is a view in elevation of the valve head illustrated in Fig. 2 with portions cut away to show details of its construction.

In the construction illustrated in Fig. 3, the spring 25 retains the ball 23 in position in the lower end of the stem 19 to close the opening 21. Otherwise, the construction of the portion of the valve illustrated in Fig. 3 is similar to that shown in Fig. 2.

Figure 4:
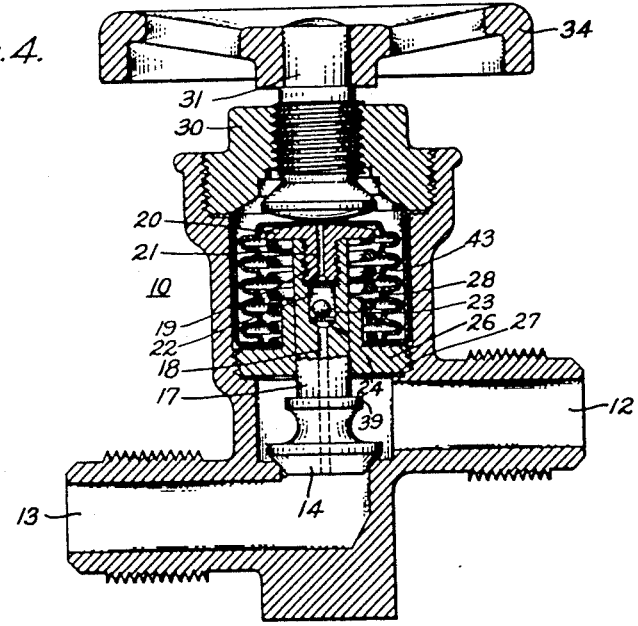
Fig. 4 is a view, partly in side elevation and partly in section, of a modification of the valve.

In the embodiment of the invention illustrated in Fig. 4, a bellows 43 is employed in place of the diaphragm 29 and is disposed in the auxiliary valve chamber and retained in position by the cap 30. It will be noted that the cap 30 and plug 26 are somewhat different in shape from that shown in Fig. 1. However, this does not change the functioning of the valve in any way.

A sylphon bellows has been employed with success. However, any other suitable bellows known to the art may also be employed to make the member 43.

In the operation of the modification illustrated in Fig. 4, when the valve is exposed to fluid under pressure entering through the opening 12, and it is desired to open the valve to permit the fluid under pressure to flow through the passageway, the actuating stem 31 is operated to move it upwardly. Fluid under pressure flows upwardly between the plug 26 and the valve stem 17. The bellows 43 will follow the actuating stem 31 upwardly and clear the opening 21. Fluid under pressure will flow downwardly through the opening, the chamber 22 and the bore 18. The pressures on the valve head will thus be substantially balanced and the spring 28 will move the valve stem 17 and valve head 14 upwardly, opening the valve.

When it is desired to replace the bellows, the cap 30 may be removed in the usual manner. The valve head will be actuated upwardly causing the flange 39 to engage the plug 26. The flow of fluid under pressure between the plug 26 and the valve stem 17 will stop. The check valve will also function to prevent the flow of gas through the opening in the valve stem. Therefore the bellows may be removed and a new one inserted in the same manner as described for the diaphragm 29 of Fig. 1.

Figure 5:
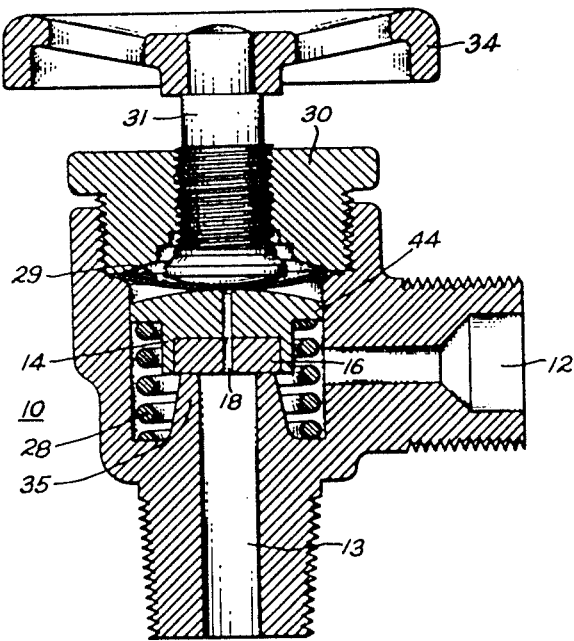
Fig. 5 is a view, partly in section and partly in side elevation, of a second modification of the valve.
Figure 5:
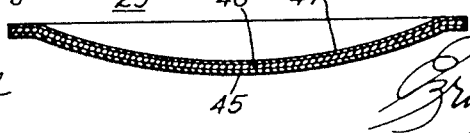

In the modification of the invention illustrated in Fig. 5, a more simple structure is provided. In this construction the boss 35 provided in the valve casing 10 is made high enough to receive the spring 28. This spring is disposed to engage underneath a flange 44 provided on the valve head 14. The diaphragm 29 is set immediately on the valve head and the opening or bore 18 extends through the valve head and insert 16.

In operation, when the valve is subjected to fluid under pressure, it will penetrate between the flange 44 provided on the valve head and the wall of the casing since the valve head 17 is loosely mounted in the casing in a manner corresponding to the mounting of the valve stem 17 in the plug 26 as described for Fig. 1. Assuming now that the valve is to be opened when exposed to pressure through opening 12 and that there is no pressure on the lower face of the valve head, then when the actuating stem 31 is moved upwardly, the diaphragm 29 becomes released from the head 14 and fluid under pressure will penetrate between the head 14 and casing and flow through the opening or bore 18 to effect the desired balance. As soon as the substantial balance is effected, the spring 28 will raise the valve head, opening the passageway through the valve.

The main feature of this invention, as illustrated in all the modifications, is to effect a substantial balance of pressures on the valve head. When this has been accomplished, the means provided for actuating the valve head will function to effect an opening of the valve.

Referring now to Fig. 6, the diaphragm 29 is shown to be a laminated structure The lowermost layer 45 may be made of any suitable material capable of withstanding the fluids under pressure with which the valve may be utilized. It has been found for most purposes that a sheet of stainless steel has the desired corrosion resistant properties. The middle layer 46 may be made of soft bronze annealed. The top layer or sheet 47 will preferably be made of hard bronze to stand the wear caused by the rotation of the head 32 and to provide a low coefficient friction which facilitates the operation of the valve.

A diaphragm of this construction has a plurality of layers and the possibility of getting any two of these layers or diaphragms with the same defect aligned is small. The diaphragm or sheet of soft bronze is employed because of its sealing properties. The diaphragm of hard bronze is utilized because of its low friction and its capacity to stand up to the wear of the head 32.

The diaphragm may be made of any predetermined shape depending on the conditions to be met in the design of the valve.

Since various changes may be made in the above described construction and arrangement of parts, and different embodiments may be made without departing from the scope and spirit thereof, it is intended that all matter contained in the above description or shown in the accompanying drawings shall be interpreted as illustrative and not in a limiting sense.

I claim as my invention:

1. In a valve structure for controlling the flow of fluids, in combination, a valve casing provided with a valve chamber and having a plurality of openings leading from the valve chamber to provide a passageway through the valve structure, means disposed in the valve chamber for dividing it into an auxiliary valve chamber and a main valve chamber, the passageway being through the main valve chamber, a valve stem loosely mounted in the means dividing the valve chamber into an auxiliary valve chamber and a main valve chamber thereby permitting fluid under pressure to flow from one valve chamber to the other valve chamber, a valve head carried by the valve stem and disposed to control the flow of fluid through the passageway, and means for actuating the valve head, the valve head and valve stem being disposed for movement in one direction independently of the actuating means, said valve head and stem having a bore extending through them to cooperate in the balancing of pressures to facilitate the operation of the valve head.

2. In a valve structure, in combination, a valve casing providing a valve chamber and having a plurality of openings leading from the valve chamber to provide a passageway through the valve structure, a plug disposed in the casing dividing it into a plurality of compartments the upper one being an auxiliary valve chamber while the lower one is a main valve chamber, the plug having an opening extending therethrough, a valve stem loosely mounted in the opening in the plug to permit the flow of fluid under pressure from the main valve chamber to the auxiliary valve chamber, a valve head carried by the valve stem and disposed to control the flow of fluids under pressure through the passageway, means for actuating the valve head, the valve stem and valve head having a bore extending therethrough, a diaphragm disposed in the auxiliary valve casing between the stem and valve actuating means, the diaphragm and valve actuating means being disposed to cooperate with the stem to close the bore through the valve stem and valve head when the valve head stands in closed position to prevent the flow of fluids through the passageway.

3. In a valve structure, in combination, a valve casing provided with a valve chamber and a plurality of openings leading from the valve chamber to provide a passageway through the valve structure, a plug disposed in the casing dividing the valve chamber into an auxiliary valve chamber and a main valve chamber, the plug having an opening therethrough, a valve stem loosely mounted in the opening in the plug to permit the flow of fluids under pressure from the main valve chamber to the auxiliary valve chamber, a valve head carried by the valve stem, means for actuating the valve stem and valve head to control the flow of fluids through the passageway, the valve stem and valve head having a bore extending therethrough to permit the flow of fluids between the valve chambers, a diaphragm disposed in the auxiliary valve chamber between the valve stem and actuating means, said diaphragm cooperating to close the opening through the valve stem and valve head when the valve stands in closed position, preventing the flow of fluids through the passageway, means for biasing the valve head to an open position, the bore through the valve stem and head permitting the balancing of pressures on the valve head and valve stem to cooperate in the operation of the valve head, and a check valve disposed to cooperate to prevent the flow of fluids under pressure through the valve head and valve stem in one direction.

4. In a valve structure for controlling the flow of fluids, in combination, a valve casing having a valve chamber and a plurality of openings leading from the valve chamber cooperative to provide a passageway through the valve structure, a plug disposed in the valve chamber dividing it into an auxiliary valve chamber and a main valve chamber, a valve stem loosely disposed in the valve plug to permit fluid under pressure to flow from one valve chamber to the other valve chamber, a valve head carried by the valve stem and disposed to control the flow of fluid through the passageway, means for actuating the valve stem and head, said valve stem and head having a bore extending therethrough to cooperate in the substantial balancing of pressures on the valve head to facilitate its operation, and a bellows disposed in the auxiliary valve chamber cooperative with the valve actuating means to close the bore through the valve stem and valve head and to prevent the leakage of fluid under pressure past the valve actuating means.

5. In a diaphragm valve structure for controlling the flow of fluids under pressure, in combination, a valve casing having a valve chamber, means disposed in the valve chamber dividing it into a main valve chamber and an auxiliary valve chamber, the casing having an inlet opening leading into and an outlet opening leading out of the main valve chamber, the main valve chamber thereby constituting a part of a passageway through the valve, the means provided for dividing the valve chamber having an opening therethrough, a valve having a head for controlling the flow of fluid under pressure through the passageway, the valve being disposed for movement in the opening in the dividing means and operable to interrupt the flow of fluid under pressure from the main valve chamber through the outlet opening, the valve being constructed to provide for the flow of fluid under pressure from the main valve chamber to the auxiliary valve chamber, the valve head having a bore extending therethrough to provide for the flow of fluid from the auxiliary valve chamber through the outlet opening when the valve head stands in position to interrupt the flow of fluid under pressure from the main valve chamber through the outlet opening, thereby to tend to equalize the pressures applied to the valve head when the main valve chamber receives fluid under pressure, and a diaphragm disposed in the auxiliary valve chamber to cooperate in closing the bore through the valve head when the valve head stands in position to interrupt the flow of fluid under pressure from the main valve chamber through the outlet opening 6. In a diaphragm valve structure for controlling the flow of fluids under pressure, in combination, a valve casing having a valve chamber, means disposed in the valve chamber dividing it into a main valve chamber and an auxiliary valve chamber, the casing having an inlet opening leading into and an outlet opening leading out of the main valve chamber, the main valve chamber thereby constituting a part of a passageway through the valve, the means provided for dividing the valve chamber having an opening therethrough, a valve stem disposed for movement in the opening in the dividing means, a valve head carried by the valve stem and operable to interrupt the flow of fluid under pressure from the main valve chamber through the outlet opening, the valve being constructed to provide for the flow of fluid under pressure from the main valve chamber to the auxiliary valve chamber, the valve head and stem having a bore extending therethrough to provide for the flow of fluid from the auxiliary valve chamber through the outlet opening when the valve head stands in position to interrupt the flow of fluid under pressure from the main valve chamber through the outlet opening, thereby to tend to equalize the pressures applied to the valve head when the main valve chamber receives fluid under pressure, a diaphragm disposed in the auxiliary valve chamber to cooperate in closing the bore through the valve head and stem when the valve head stands in position to interrupt the flow of fluid under pressure from the main valve chamber through the outlet opening, a spring disposed to bias the valve head and stem in one direction, and means for actuating the valve head and stem in the opposite direction to effect the interruption of the flow of fluid under pressure from the main valve chamber through the outlet opening.

7. In a diaphragm valve structure for controlling the flow of fluids under pressure, in combination, a valve casing having an inlet and an outlet and a valve chamber to provide a passageway through the valve, a valve stem and head disposed for movement in the valve chamber for controlling the flow of fluid under pressure in the passageway, means for biasing the valve stem and head in one direction, means for actuating the valve stem and head in the opposite direction, and a diaphragm disposed between the valve stem and actuating means, the valve stem and head having a bore therethrough to permit the flow of fluid under pressure from the auxiliary valve chamber to the outlet, the diaphragm being disposed for operation to interrupt the flow of fluid under pressure through the bore in the valve head, whereby when the actuating means is operated to effect the opening of the valve, fluid under pressure flows through the bore in the valve head to cooperate in the actuation of the valve head in one direction.

8. In a diaphragm valve structure for controlling the flow of fluid under pressure, in combination, a valve casing having a valve chamber, means for dividing the valve chamber into a main valve chamber and an auxiliary valve chamber, the main valve chamber constituting a part of a passageway through the valve, the means for dividing the valve chamber having an opening, a valve stem disposed for movement in the opening in said dividing means, the valve being so constructed that fluid under pressure may flow from the main valve chamber to the auxiliary valve chamber, a valve head carried by the valve stem, the valve stem and head having a bore therethrough whereby fluid under pressure may flow from the auxiliary valve chamber through the valve stem and head tending to balance the pressures on the valve head, a diaphragm disposed in the auxiliary valve chamber, and actuating means for actuating the diaphragm into engagement with the valve stem to interrupt the flow of fluid under pressure through the valve stem and head.

9. In a valve structure for controlling the flow of fluids under pressure, in combination, a valve casing having a valve chamber to provide a passageway through the valve, a valve head disposed in the valve casing to interrupt the flow of fluids through the passageway, means for biasing the valve head in one direction, means for actuating the valve head in the other direction to interrupt the flow of fluid through the passageway, and a diaphragm disposed between the valve head and the actuating means, the valve head having a bore extending therethrough to permit the flow of fluid under pressure to effect the building up of a fluid pressure on the lower face of the valve head to cooperate with the biasing means to effect the actuation of the valve head in one direction when the actuating means has been operated to release the valve head, said actuating means being operable to move the diaphragm into engagement with the valve head to interrupt the flow of fluid through the bore in the valve head.

10. In a diaphragm valve for controlling the flow of fluids under pressure, in combination, a valve casing having a valve chamber, an inlet opening leading into the valve chamber and an outlet opening leading from the valve chamber to provide a passageway through the valve, a valve head disposed for movement in the valve chamber to interrupt the flow of fluid under pressure through the passageway, means disposed to bias the valve head in one direction, manually operable means disposed to actuate the valve head in the opposite direction, and a diaphragm disposed between the valve head and the manually operable actuating means, said valve head having a bore therethrough to permit the flow of fluid under pressure from the valve chamber to the outlet opening to build up pressure to cooperate with the biasing means to actuate the valve head in one direction, said diaphragm being disposed in alignment with the bore in the valve head whereby it may be actuated into engagement with the valve head to interrupt the flow of fluid under pressure from the valve chamber through the valve head 11. In a diaphragm valve structure for controlling the flow of fluids under pressure, in combination, a valve casing having a valve chamber, means disposed in the valve chamber dividing it into a main valve chamber and an auxiliary valve chamber, the casing having an inlet opening leading into and an outlet opening leading from the main valve chamber to provide a passageway through the valve, the means for dividing the valve chamber being provided with an opening therethrough, a valve stem disposed for movement in the opening in the dividing means, a valve head carried by the valve stem, the valve stem being constructed to provide for the flow of fluid under pressure from the main valve chamber to the auxiliary valve chamber when the valve head stands in its closed position to interrupt the flow of fluid through the passageway, the valve stem and head having a bore therethrough to permit the flow of fluid under pressure from the auxiliary valve chamber to the outlet opening when the valve stands in position to interrupt the flow of fluid under pressure through the passageway, a diaphragm disposed above the valve stem, means for actuating the diaphragm into engagement with the valve stem to interrupt the flow of fluid from the auxiliary valve chamber to the outlet opening, and means provided on the valve head for back seating on the dividing means when the valve stands in its open position.

12. In a diaphragm valve structure for controlling the flow of fluids under pressure, in combination, a valve casing having a valve chamber, a plug disposed in the valve chamber dividing it into a main valve chamber and an auxiliary valve chamber, said casing having an inlet opening leading into and an outlet opening leading from the main valve chamber, the plug having an opening therethrough, a valve stem loosely mounted in the opening in the plug, a valve head carried by the valve stem, the valve head being disposed for movement to interrupt the flow of fluid from the main valve chamber through the outlet opening, means for biasing the valve stem and head in one direction, means provided on the valve head to back seat on the plug when the valve head is actuated by said biasing means, the valve stem and head having a bore therethrough to provide for the flow of fluids under pressure from the auxiliary valve chamber through the outlet opening when the valve head stands in position to interrupt the flow of fluids through the valve, a check valve disposed in the bore of the valve stem and head to prevent the flow of fluid under pressure from the outlet opening to the auxiliary valve chamber, a diaphragm disposed in the auxiliary valve chamber, manually operable means for actuating the valve stem and head into position to interrupt the flow of fluid under pressure through the valve, and means disposed to cooperate with the valve head as it is actuated downwardly to give it a turning movement to cooperate in effecting a good seating of the valve head.

13. In a valve structure for controlling the flow of fluids under pressure, in combination, a valve casing having a valve chamber, a valve head disposed for movement in the valve chamber to control the flow of fluids under pressure through the valve, means for actuating the valve head in one direction, and means disposed to bias the valve head in the opposite direction, the valve head having a bore extending therethrough, the actuating means being disposed in alinement with the bore and for movement relative to the valve head to control the flow of fluid through the bore, the bore being provided to permit the flow of fluid under pressure to tend to equalize the pressures on the opposite faces of the valve head to cooperate in the operation of the valve head.

14. A valve structure for controlling the flow of fluid under pressure comprising, in combination, a valve casing having a valve chamber, means extending across the chamber dividing it into a main chamber and an auxiliary chamber, the casing having an inlet opening and an outlet opening leading into the main valve chamber, the inlet and outlet openings and the main valve chamber serving as a fluid passageway through the valve casing, the means provided for dividing the valve chamber having an opening therethrough, a valve stem movably disposed in the opening, the valve stem permitting the flow of fluid under pressure from the main valve chamber to the auxiliary valve chamber, a valve head carried by the valve stem, a spring disposed to bias the valve head in one direction, the valve stem and valve head having a bore therethrough to cooperate in balancing pressures on the valve head when the valve head stands in closed position and is subjected to fluid under pressure to permit the spring to operate the valve head, means for actuating the valve head to the closed position, a bellows disposed between the actuating means and the valve stem and head, the bellows being in contact with the casing to substantially seal the valve, and a check valve disposed to prevent the flow of fluid under pressure to the auxiliary valve chamber through the bore.

15. In a diaphragm valve for controlling the flow of fluids under pressure, in combination, a valve casing having a valve chamber, the casing having an inlet opening and an outlet opening leading into the valve chamber, a valve seat around an opening, a valve head slidably mounted in the valve chamber and disposed in alinement with the valve seat, the valve head being so mounted in the valve chamber as to permit fluid under pressure to flow around it and having a bore extending through it to permit fluid under pressure to flow therethrough, a spring disposed to bias the valve head in one direction, means for actuating the valve head in the other direction, and a diaphragm disposed between the valve head and the actuating means, the diaphragm engaging the valve casing to make a substantially fluid-tight seal.

16. In a valve structure for controlling the flow of fluids under pressure, in combination, a valve casing having a valve chamber and a plurality of openings leading from the valve chamber providing a passageway through the valve structure, a valve head disposed in the valve casing to control the flow of fluids through the passageway, the valve head having a bore extending therethrough to provide for the flow of fluids under pressure, manually operable means for actuating the valve head in one direction, a spring for biasing the valve head in the opposite direction, a diaphragm disposed between the valve head and the manually operable actuating means, the manually operable valve head actuating means and the diaphragm cooperating to close the bore through the valve head when the valve stands in closed position, the bore permitting the flow of fluid under pressure to build up pressures to cooperate with the biasing means to raise the valve head to open position when the manually operable valve head actuating means stands in the open position.

HARRY H. LAMAR.